United States Patent [19]
Towns et al.

[11] Patent Number: 4,784,817
[45] Date of Patent: Nov. 15, 1988

[54] METHOD OF MAKING A CONTAINER CLOSURE

[75] Inventors: Edward J. Towns, Morristown; Edward M. Brown, Livingston, both of N.J.; William M. Lester, Delray Beach, Fla.

[73] Assignee: TBL Development Corporation, Livingston, N.J.

[21] Appl. No.: 648,059

[22] Filed: Sep. 7, 1984

[51] Int. Cl.$^4$ .................. B29C 45/16; B65D 41/04
[52] U.S. Cl. ............................. 264/219; 264/255; 264/328.7; 264/328.8; 264/DIG. 76
[58] Field of Search ............... 264/255, 328.7, 328.8, 264/DIG. 76, 246, 219

[56] References Cited

U.S. PATENT DOCUMENTS

| 2,072,536 | 3/1937 | Trickey et al. | 215/38 |
| 2,333,059 | 10/1943 | Tucker | 264/161 |
| 2,479,383 | 8/1949 | MacMillin | 264/161 |
| 3,176,867 | 4/1965 | Reynolds | 215/40 |
| 3,458,077 | 7/1969 | Ryan | 215/329 |
| 3,482,284 | 12/1969 | Rees | 264/161 |
| 3,527,375 | 9/1970 | Klein | 220/42 |
| 3,536,224 | 10/1970 | Green | 215/40 |
| 3,612,322 | 10/1971 | Linkletter | 215/9 |
| 3,702,750 | 11/1972 | Veneria | 425/130 |
| 3,866,845 | 2/1975 | Keeler et al. | 215/341 |
| 3,914,081 | 10/1975 | Aoki | 425/130 |
| 4,347,939 | 9/1982 | Upton | 215/252 |
| 4,416,602 | 11/1983 | Neumeister | 425/130 |
| 4,489,844 | 12/1984 | Breskin | 264/328.8 |

FOREIGN PATENT DOCUMENTS 59073930  10/1982  Japan .................. 264/328.8

Primary Examiner—Jan H. Silbaugh
Assistant Examiner—Leo B. Tentoni
Attorney, Agent, or Firm—Robin, Blecker & Daley

[57] ABSTRACT

A container closure is comprised of a closure member molded on a liner, the liner having a first surface secured to the closure member and a second surface opposite the first surface and including a member depending therefrom and configured both for effecting sealing of a container and for releasable securement of the liner to a forming member in the course of such molding of the closure member thereon. The closure member and liner materials may thus be diverse, since they are separately formed. While there are separate manufacturing steps for making the liner and the closure member, the customary step of assembling preformed liners with preformed closure members to obtain desired performance diversity therebetween is eliminated.

15 Claims, 7 Drawing Sheets

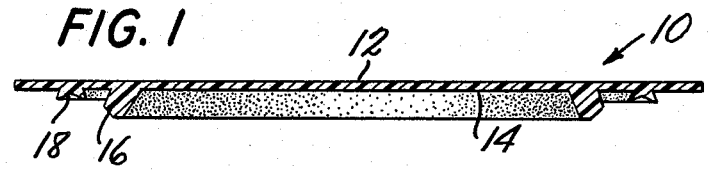
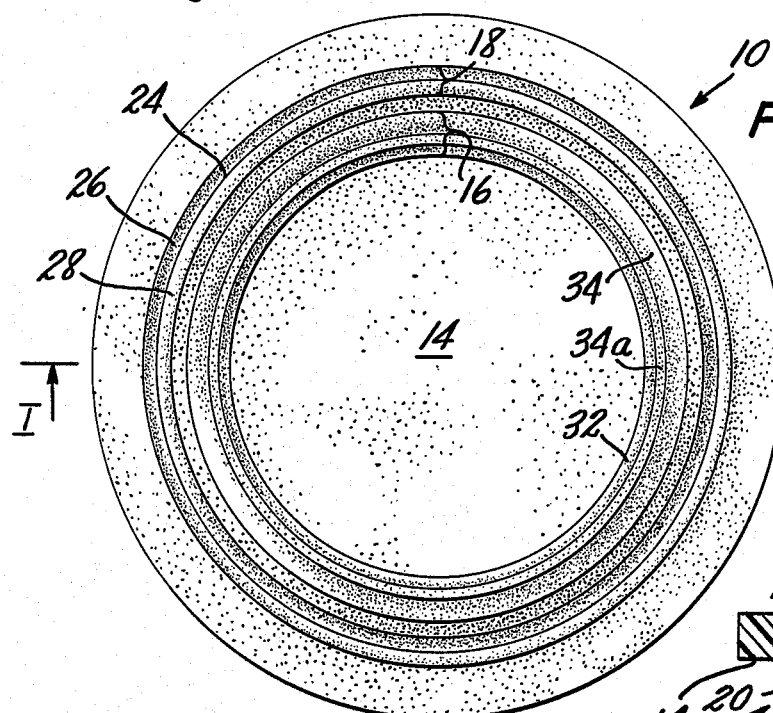
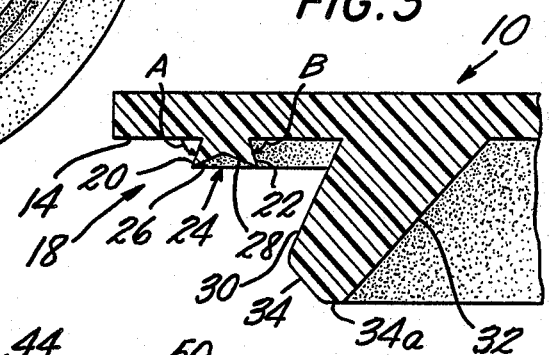
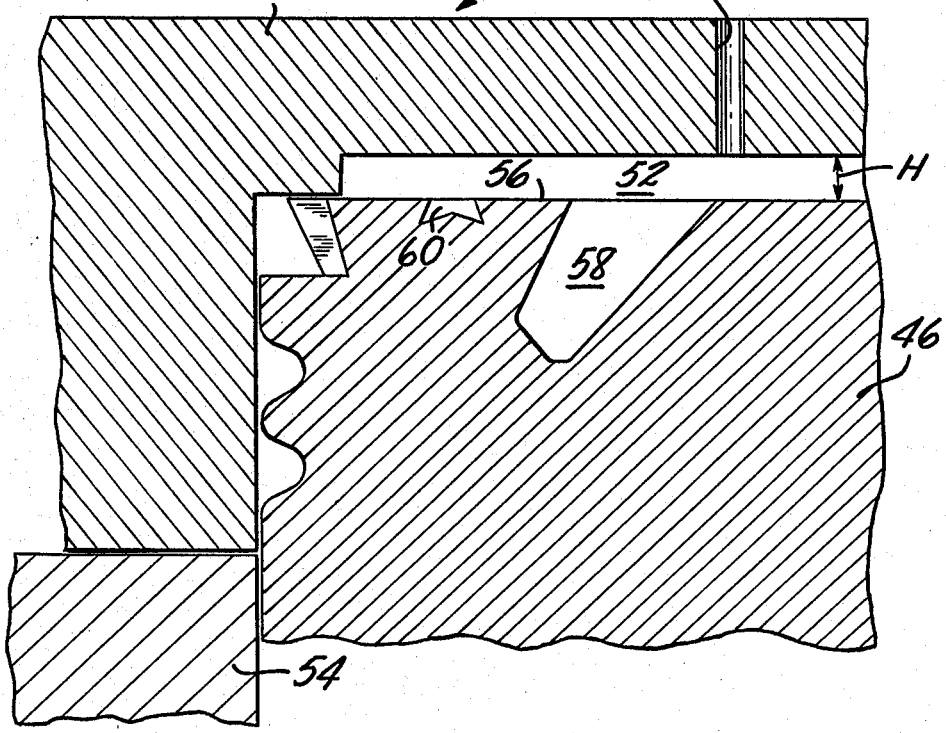

METHOD OF MAKING A CONTAINER CLOSURE

FIELD OF THE INVENTION

This invention relates generally to container closures and methods for manufacture thereof and pertains more particularly to pressure and vacuum resistant closures and to the making of same.

BACKGROUND OF THE INVENTION

The container industry has been various approaches to the solution of its requirement, particularly for food and like product containment, of impregnability of containers as respects pressure and vacuum. Applicants herein have participated in such efforts to meet the given requirement, as elicited in a U.S. patent discussed below and disclosing structure involving cap or closure refinement and container neck outlines cooperative with same.

Where one addresses the pressure and vacuum impregnability requirement with a view to accomodate standard container neck outlines, as contrasted with the above-noted involvement of applicants with specially configured container necks, the solution has typically involved the production of a cap, the separate production of a liner having the required sealing capabilities and a further step of assembling the individually produced cap and liner.

Other efforts have looked toward the common molding of a cap with liner, i.e., by introducing a common material into a mold configured to yield the composite cap and liner. This practice limits the composite product to uniform characteristics, e.g., resilience and like physical properties, since such material constitutes both the cap and liner. Thus, while the costly manufacturing step of assembling a separately made liner with a separately made cap is eliminated, performance limitations accompany the practice.

SUMMARY OF THE INVENTION

The present invention has as its primary object the provision of container closures meeting the pressure and vacuum impregnability requirements of the industry and, at the same time, facilitating less expensive manufacture of such closures and also accomodating material characteristic selection and thus performance diversity as between the cap and liner.

In attaining this and other objects, the invention provides a container closure comprised of a closure member, which is molded on a liner, the liner having a first surface secured to the top panel and a second surface opposite the first surface and including a member dependent from the liner and configured both to effect container sealing and for releasable securement of the liner to a forming member in the course of such molding of the closure member thereon. The closure member and liner materials may thus be diverse, since they are separately formed. While there are separate manufacturing steps for making the liner and the closure member, the invention eliminates the customary step of assembling preformed liners with preformed closure members to obtain the desired performance diversity therebetween.

DESCRIPTION OF THE DRAWINGS

FIG. 1 is sectional view of a first embodiment of a liner in accordance with the invention as would be seen from plane I—I of FIG. 2.

FIG. 2 is full bottom plan view of the FIG. 1 liner.

FIG. 3 is an enlarged view of the leftward end portion of the FIG. 1 liner.

FIG. 4 is a partial sectional view showing a forming tool for the FIG. 1 liner.

DESCRIPTION OF PREFERRED EMBODIMENTS AND PRACTICES

Figure 5:
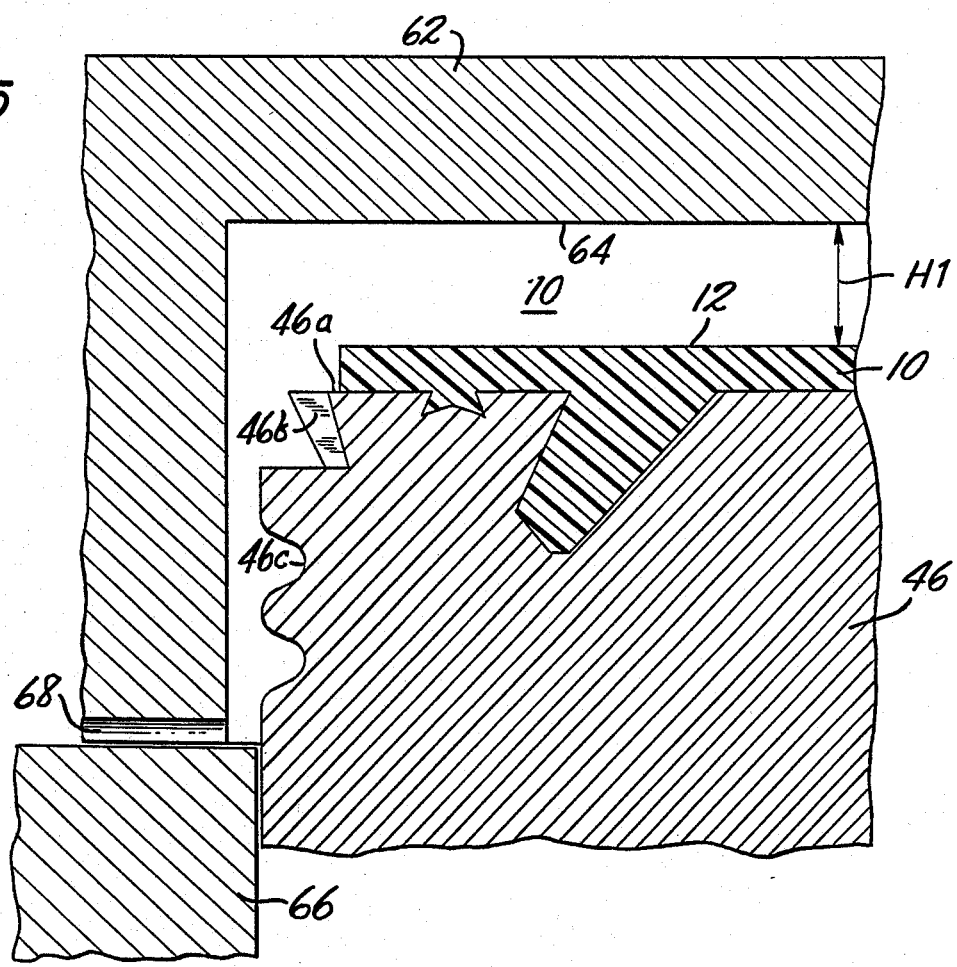
FIG. 5 is a partial sectional view showing a liner as would be formed by the FIG. 4 forming tool resident in a further forming tool for a closure member or cap.

Referring to FIGS. 1 and 2, liner 10 is a cylindrical body having top surface 12 and undersurface 14, the latter having first and second container sealing members 16 and 18 depending therefrom.

Sealing member 18 constitutes a secondary container seal and, as disussed below also functions in plural method aspects, namely, to retain liner 10 with a closure member (cap) forming tool and to preclude melt material for cap forming from egress therebeneath during cap forming. For both purposes, member 18 is configured, as is seen in the enlarged view of FIG. 3, with radially exterior surface 20 and radially interior surface 22, having respective opposite divergences relative to liner 10 undersurface 14, as indicated by angles A and B in FIG. 3. These angles are preferably equal, and distend respectively counterclockwise and clockwise from undersurface 14, as shown by their course lines and arrows. Groove 24 is formed interiorly of surface 20 and 22 and is bounded by sealing surfaces 26 and 28. All of surfaces 20, 22, 26 and 28 are endless and circular, as is seen in FIG. 2.

Sealing member 16 constitutes a primary container seal and is depicted, akin to the container seal shown in U.S. Pat. No. 4,087,016, issued in the names of applicants herein and others on May 2, 1978 and alluded to at the outset above. As such, member 16 includes a first course 30 depending acutely from liner undersurface 14, a second course 32 depending at a lesser acute angle from liner undersurface 14 than course 30, and a third tapered course 34 with end flat 34a bridging the ends of courses 30 and 32 and itself extending radially downwardly relative to liner undersurface 14.

Figure 7:
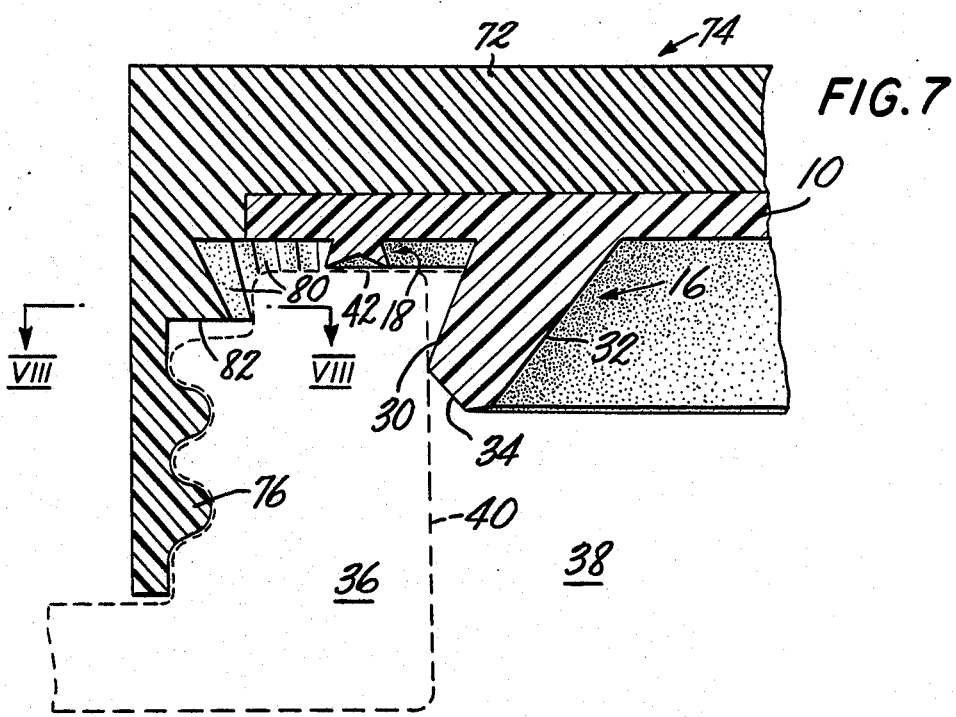
FIG. 7 is a partial sectional view showing the closure of FIG. 6 in assembly with a container, the container being indicated in phantom lines.

In the initial course of application of liner 10 to the neck 36 of container 38 (FIG. 7), third course 34 seats within the neck opening and cams courses 30 and 32 into illustrated relationship with neck interior wall 40 as the liner is pressed down upon the container. This action effects a primary sealing of the container, since such deformation of sealing member 16 gives rise to a resilient biasing of first course 30 against neck wall 40.

As liner 10 fully seats on container neck 36, secondary sealing member 18 confronts neck top surface 42 and resiliently engages same, providing a secondary seal in the embodiment under discussion.

Referring now to FIG. 4, liner forming tool 44 includes core 46 and liner forming mold half 48, having melt passage 50 extending into cavity 52. Ejector mold half is disposed to position core 46 precisely relative to mold half 48 to define cavity height H. As will be seen in FIG. 4, core 46 has its upper working end 56 configured with recesses 58 and 60, corresponding to sealing members 16 and 18, respectively, and upon introduction of melt matter and setting of same, separation of core 46 from jacket 48 results in the formation of liner 10 of FIG. 1, nested atop surface 56 of core 46 and secured therewith by reason of the containment of sealing member 18 in core recess 58.

As will be appreciated by those skilled in the injection molding art, plastic shrinkage occurs radially inwardly in the course of setting and curing of material comprising the injection molded article. In the present instance, liner 10 shrinks radially inwardly and such shrinkage results particularly in surfaces 22 and 28, i.e., the radially inward surfaces of sealing member 18, tightly nesting in the radially interior portion of recess 60, effecting a releasable securement of liner 10 to core 46. Such securement is at a sufficiently radially outward location on liner 10 to further preclude cap forming melt material from egress into the interstice between liner 10 and core surface 56.

The liner forming practice just discussed preferably takes place at a first station of commercially available molding apparatus which includes a rotatable support table indexable by 180 degree rotation to a second station. While the first station places core 46 in liner mold half 48, the second station places core 46 with formed liner 10 thereon, as depicted in FIG. 5, interiorly of closure member forming mold half 62. Surface 64 of mold half 62 is spaced by height H1 from liner top surface 12 by engagement of ejector mold half 66 and the side end 66 of mold half 62. Melt passage 68 extends into cavity 70.

Unlike the situation applying in the course of forming of liner 10 with mold half 48, which seated upon ledge 46a of forming tool 46 and thus rendered inoperative both tooth cavity 46b and thread cavity 46c of tool 46, mold half 62 is configured to render cavities 46b and 46c operative.

Figure 6:
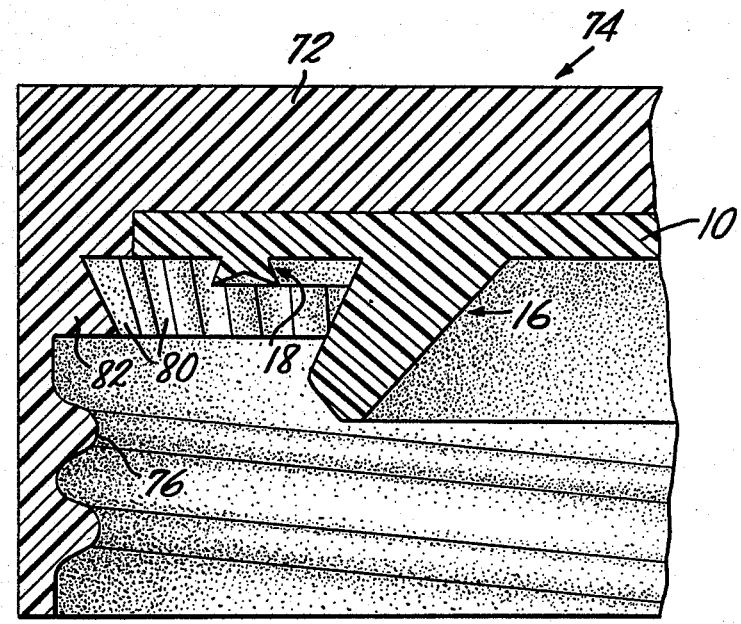
FIG. 6 is a partial sectional view showing a closure as would be formed by the FIG. 5 forming tool with such liner resident therein.

In the course of melt conveyance into cavity 70, cap or closure member 72 is formed in secured relation to liner 10, as shown in FIG. 6, forming closure 74. Upon setting of the melt in cavity 70, core 46 is removed from closure 74, as by stripping or unscrewing, sealing members 16 and 18 exiting recesses 58 and 60 and overcoming the retention forces as between sealing member 18 and core 46. Sealing members 16 and 18 and cap threads 76 survive a stripping operation with formed configuration as in FIG. 6.

At this stage of the operation of practice with the commercial injection molding apparatus, core 46 is returned to the first working station and practice repeats as above described. Liner 10 material is so selected and the indexing cycle time is so set that the liner sets and cures in the course of movement of core 46 from the first station to the second station. Diverse material liners may thus be introduced with diverse material cap melt matter in accordance with the invention. Accordingly, the closure member may be formed of material of one durometer (flex modulus) for rigidity and strength, whereas the liner may be formed of a material of another durometer for flexibility desired for sealing action of sealing members 16 and 18 thereof. In typical selection, the liner material is a polypropylene copolymer or similar plastic marterial having like physical and/or chemical characteristics and having a flex modulus of from about 115K to approximately 160K and the closure material is a monopolymer of flex modulus of 160K and greater. Liner 10 may be secured to the closure member by mutual bond between the materials accomplished by molding process of two materials having an affinity for one another.

Returning again to FIG. 5, cavity 70 will be seen to include a flute former in each of its teeth forming cavities 46b for forming flutes or teeth 80 shown on ring 82 in FIG. 6.

Figure 8:
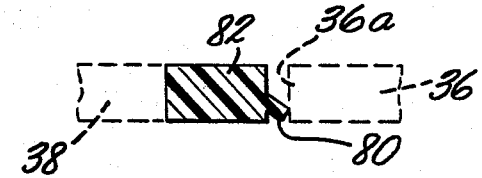
FIG. 8 is a sectional slice of the FIG. 7 closure as would be seen from plane VIII—VIII of FIG. 7.

In the course of threading of closure 74 onto container neck 36 (FIG. 7), flutes 80 are deflected upon engagement with the container neck in disposition indicated in FIG. 8, i.e., so as to provide a reverse or interference fit with the container neck surface. Upon reverse sense movement thereof, as in the case of "back-off" (self-opening tendency), ring 82 and particularly flutes 80 thereon constitute back-off retardant means. Such retardant means can be enhanced if corresponding flutes are formed on the container. Opening sense movement exerted by one wishing to open the closure readily overcomes the resistance of flutes 80.

Figure 9:
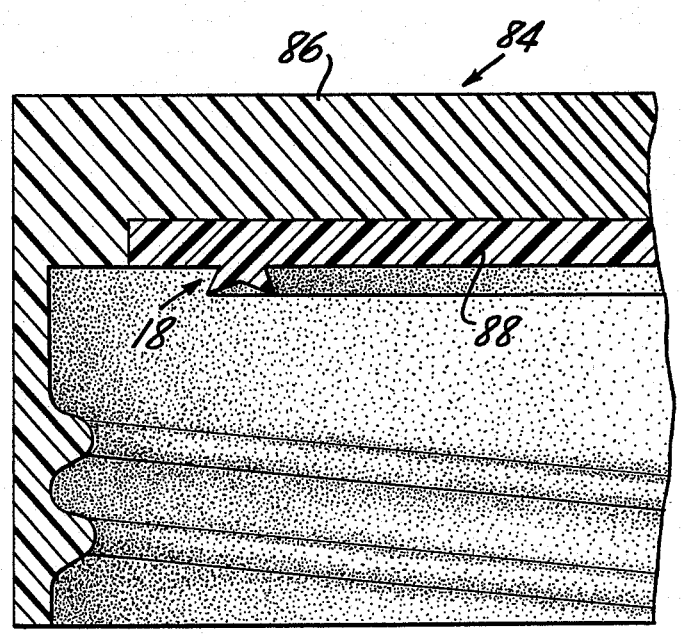
FIG. 9 is a partial sectional view of a second embodiment of a closure in accordance with the invention embodying a closure member and liner differently configured from the closure of FIG. 7.

In FIG. 9, a second closure embodiment 84 includes closure member 86, alike to closure member 72 has been formed atop liner 88, except for the absence of ring 82 and flutes 80 which are omitted in the abosence of need for anti-backoff capability. Liner 88 also differs from liner 10 in omitting sealing member 16. Here, sealing member 18 is a primary and sole sealing means and no secondary sealing member is involved.

Figure 10:
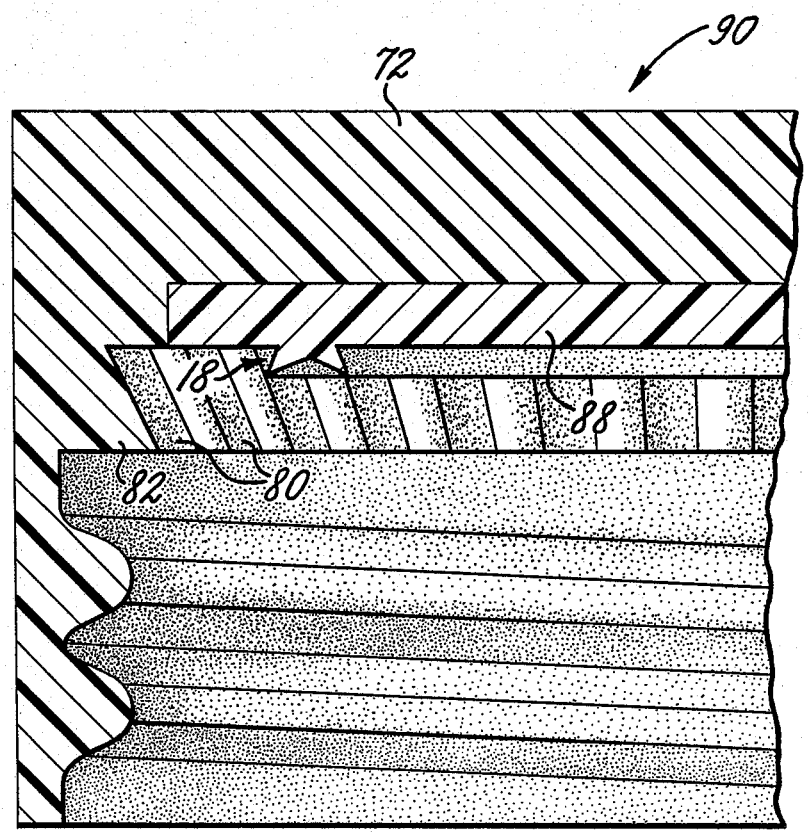
FIG. 10 is a partial sectional view of a third embodiment of a closure in accordance with the invention embodying the closure member of FIG. 7 in conjunction with the liner of the FIG. 9 embodiment.

Turning to FIG. 10, in closure embodiment 90, liner 88 is employed with closure member 72 and sealing member 18 is now coactive with flutes 80 to provide primary sealing of a container with anti-backoff capability.

Closures in accordance with the invention will be seen to have in common sealing member 18 or its equivalent in structure, one surface of which is in communication with ambient or environmental pressure, i.e., surface 20, and another surface which is in communication with container interior pressure, i.e., surface 22. Assuming the container contents being sealed by closures of the invention to be positively pressurized, as in the case of carbonated beverages, the ultimate sealing surface confronted by same will be surface 22, and pressure exerted by the contained positively pressurized medium will act on surface 22 to increase sealing force for the container. Considering the alternative, namely, where the contained contents create a vacuum, as in the case of fluid contents applied at elevated temperature at the containment station, the environment has higher pressure than the contents and acts upon surface 20. The consequence of the described structure is again sealingly responsive to applied pressure differential, since surface 20 will coact increasingly sealingly to environmental pressure in the latter situation.

In addition to such pressure/vacuum adaptiveness, liners of the invention have the further capabilities noted above of both retaining the liner with a closure member forming tool core and of precluding egress of closure member forming melt material into the interstice between the closure member forming tool core and the formed liner thereon.

Methods in accordance with the invention will be seen to involve a sequence of steps as follows. One configures a forming tool core and a first forming tool jacket to define a first cavity for the making of a liner of any one of the several outlines depicted above or other chosed outline. The core is now placed in the first forming tool jacket and one introduces first molding material into the first cavity, thereby to form a liner on the core.

A second forming tool jacket is configured to define, with the core with formed liner thereon, a second cavity for the making of a closure member of desired outline, and one places the core with formed liner thereon in the second forming tool jacket and introduces second molding material into the second cavity, thereby to form such closure member upon said formed liner to provide a closure. The core is removed from said second forming tool jacket and the closure is removed from the second forming tool jacket.

Such method is so practiced as to configure the forming tool core with a recess adapted both to define a container sealing member for a container in the liner and to effect releasable securement of a formed liner to the forming tool core upon setting of the first molding material.

In the described method, one may configure the forming tool core with both a closure member thread former and an anti-backoff ring and flute former. Here, the first forming tool jacket is configured so as to preclude egress of the first molding material into operative relation with said closure member thread and anti-backoff ring and teeth formers. As also noted, the core may be provided with first and second recess for forming plural container sealing members.

Various changes to the foregoing embodiments and modifications to the prescribed practices may be introduced without departing from the invention. Thus, the particularly described preferred embodiments and practices are intended in an illustrative and not in a limiting sense. The true spirit and scope of the invention is set forth in the following claims.

We claim:

1. A method for making a container closure having a closure member and a liner therein comprising the steps of:
   (a) configuring a generally cylindrical forming tool core and a first forming tool jacket to define a first cavity for the making of a liner of first molding material and of preselected outline, wherein said core is shaped with a recess extending from a surface of said core radially interiorly thereof to effect shrinking of said first molding material radially interiorly against core surface bounding said recess, thereby to preclude second molding material used in closure member forming from egress into the interstice between such liner and core and to effect securement of a formed such liner with said core in the course of forming a closure member on a formed such liner;
   (b) placing said core in said first forming tool jacket and introducing first molding material into said first cavity, thereby to form a liner on said core;
   (c) configuring a second forming tool jacket to define, with said core with formed liner thereon, a second cavity for the making of a closure member of preselected outline;
   (d) placing said core with formed liner thereon in said second forming tool jacket and introducing second molding material into said second cavity, thereby to form such closure member upon said formed liner to provide a closure; and
   (e) removing said core from said second forming tool jacket and removing said closure from said second forming tool jacket.

2. The method claimed in claim 1 wherein said step (a) is practiced to configure said forming tool core with a recess adapted both to define a container sealing member for a container in said liner and to effect such securement of a formed liner to said forming tool core upon setting of said first molding material.

3. The method claimed in claim 2 wherein said step (a) is further practiced to configure said forming tool core with a closure member thread former and wherein said step (a) is also practiced in manner configuring said first forming tool jacket to preclude egress of said first molding material into operative relation with said closure member thread former of said forming tool core.

4. The method claimed in claim 2 wherein said step (a) is further practiced to configure said forming tool core with a second recess adapted to define a second container sealing member.

5. The method claimed in claim 4 wherein said step (a) is further practiced to configure said forming tool core with a closure member thread former and wherein said step (a) is also practiced in manner configuring said first forming tool jacket to preclude egress of said first molding material into operative relation with said closure member thread former of said forming tool core.

6. The method claimed in claim 2 wherein said step (a) is further practiced to configure said forming tool core with an anti-backoff teeth former and wherein said step (a) is also practiced in manner configuring said first forming tool jacket to preclude egress of said first molding material into operative relation with said anti-backoff teeth former of said forming tool core.

7. The method claimed in claim 6 wherein said step (a) is further practiced to configure said forming tool core with a closure member thread former and wherein said step (a) is also practiced in manner configuring said first forming tool jacket to preclude egress of said first molding material into operative relation with said closure member thread former of said forming tool core.

8. The method claimed in claim 2 wherein said step (a) is further practiced to configure said forming tool core with a second recess adapted to define a second container sealing member.

9. The method claimed in claim 1 wherein said first and second molding materials are selected to be respectively different in composition.

10. The method claimed in claim 1 wherein said first and second molding materials are selected to exhibit respectively diverse flexibilities in such formed closure.

11. A method for making a container closure having a closure member and a liner therein comprising the steps of:
   (a) configuring a cylindrical forming tool core with radially outward structure adapted to receive liner forming molding material and to be cooperative with a formed such liner to preclude closure member forming molding material from egress radially interiorly of such core structure beneath such formed liner, such radially outward structure being selected to extend radially interiorly to radially inward core surface to effect shrinking of said first molding material radially interiorly against such inward core surface;

(b) configuring a mold cavity to form, with said core, such liner in preselected outline;

(c) introducing such liner forming molding material into said mold cavity of said step (b) to form said liner on said core;

(d) configuring a mold cavity to form, with said core having said liner thereon, said closure member in preselected outline; and (e) introducing such closure forming molding material into said mold cavity of said step (d) to form said closure member upon said liner to provide said container closure.

12. The method claimed in claim 11 wherein said step (a) is practiced by providing said core with generally flat upper surface for forming an undersurface of such liner and by providing a radially outward recess in said core upper surface having angular divergence relative thereto.

13. The method claimed in claim 11 wherein said step (a) is further practiced by so configuring said radially outward structure as to provide for releasable securement of said liner to said core.

14. The method claimed in claim 11 wherein said step (a) is further practiced by so configuring said radially outward structure as to provide a sealing member in said liner.

15. The method claimed in claim 11 wherein said step (a) is further practiced by so configuring said radially outward structure as to provide for releasable securement of said liner to said forming tool and as to provide a sealing member in said liner.

* * * * *